(12) United States Patent
Chameroy et al.

(10) Patent No.: US 8,887,939 B2
(45) Date of Patent: Nov. 18, 2014

(54) PRESSURE-COOKING UTENSIL HAVING A DUAL-PURPOSE LOCKING/UNLOCKING CONTROL MEMBER

(75) Inventors: Eric Chameroy, Veronnes (FR);
Philippe Roussard, Le Noyer (FR)

(73) Assignee: SEB S.A., Ecully (FR)

( * ) Notice: Subject to any disclaimer, the term of this patent is extended or adjusted under 35 U.S.C. 154(b) by 713 days.

(21) Appl. No.: 13/142,774

(22) PCT Filed: Dec. 16, 2009

(86) PCT No.: PCT/FR2009/052572
§ 371 (c)(1),
(2), (4) Date: Sep. 21, 2011

(87) PCT Pub. No.: WO2010/076505
PCT Pub. Date: Jul. 8, 2010

(65) Prior Publication Data
US 2012/0000909 A1  Jan. 5, 2012

(30) Foreign Application Priority Data

Dec. 30, 2008  (FR) ...................................... 08 59144

(51) Int. Cl.
*A47J 27/08* (2006.01)
(52) U.S. Cl.
CPC .......... *A47J 27/0804* (2013.01); *A47J 27/0813* (2013.01); *A47J 27/0802* (2013.01); *A47J 27/0815* (2013.01)
USPC ....................................................... 220/324
(58) Field of Classification Search
CPC .............. A47J 27/0813; A47J 27/0815; A47J 27/0802; A47J 27/0804

USPC .............. 220/324, 315, 573.1, 912, 756, 212, 220/212.5, 367.1
See application file for complete search history.

(56) References Cited

U.S. PATENT DOCUMENTS 2,102,908 A * 12/1937 Nelson ...................... 292/256.67
2,121,596 A *  6/1938 Hill .............................. 220/314
(Continued)

FOREIGN PATENT DOCUMENTS

DE  10 2004 056 463 B3  3/2006
FR      605 293 A    5/1926

OTHER PUBLICATIONS

International Search Report mailed by the International Searching Authority (ISA/EP) on Apr. 22, 2010 in connection with PCT International Application No. PCT/FR2009/052572, filed Dec. 16, 2009.

*Primary Examiner* — Steven A. Reynolds
*Assistant Examiner* — King M Chu
(74) *Attorney, Agent, or Firm* — John P. White; Cooper & Dunham LLP

(57) ABSTRACT

The invention relates to a utensil for cooking food under pressure, which utensil comprises firstly a vessel and a lid and secondly a control member (6) for controlling locking/unlocking of the lid relative to the vessel, said utensil being characterized in that said control member (6) is mounted to move on the lid between firstly a deployed position corresponding to the lid being unlocked, and in which said control member (6) is designed to be taken hold of manually in order to enable the lid to be handled, and secondly a retracted position corresponding to the lid being locked and in which said control member is designed to be more difficult to take hold of manually than it is in the deployed position. Utensils for cooking food under pressure.

20 Claims, 5 Drawing Sheets

(56) References Cited

U.S. PATENT DOCUMENTS

| | | | | |
|---|---|---|---|---|
| 4,299,331 A | * | 11/1981 | Bertola | 220/316 |
| 4,711,366 A | * | 12/1987 | Chen | 220/316 |
| 5,906,289 A | * | 5/1999 | Aliesch et al. | 220/318 |
| 6,494,337 B1 | * | 12/2002 | Moroni | 220/314 |
| 2008/0290092 A1 | * | 11/2008 | de Bastos Reis Portugal et al. | 220/321 |
| 2012/0000909 A1 | * | 1/2012 | Chameroy et al. | 220/324 |
| 2012/0012584 A1 | * | 1/2012 | Chameroy et al. | 220/203.01 |
| 2014/0042165 A1 | * | 2/2014 | Chameroy et al. | 220/318 |
| 2014/0042171 A1 | * | 2/2014 | Chameroy et al. | 220/573.1 |

\* cited by examiner

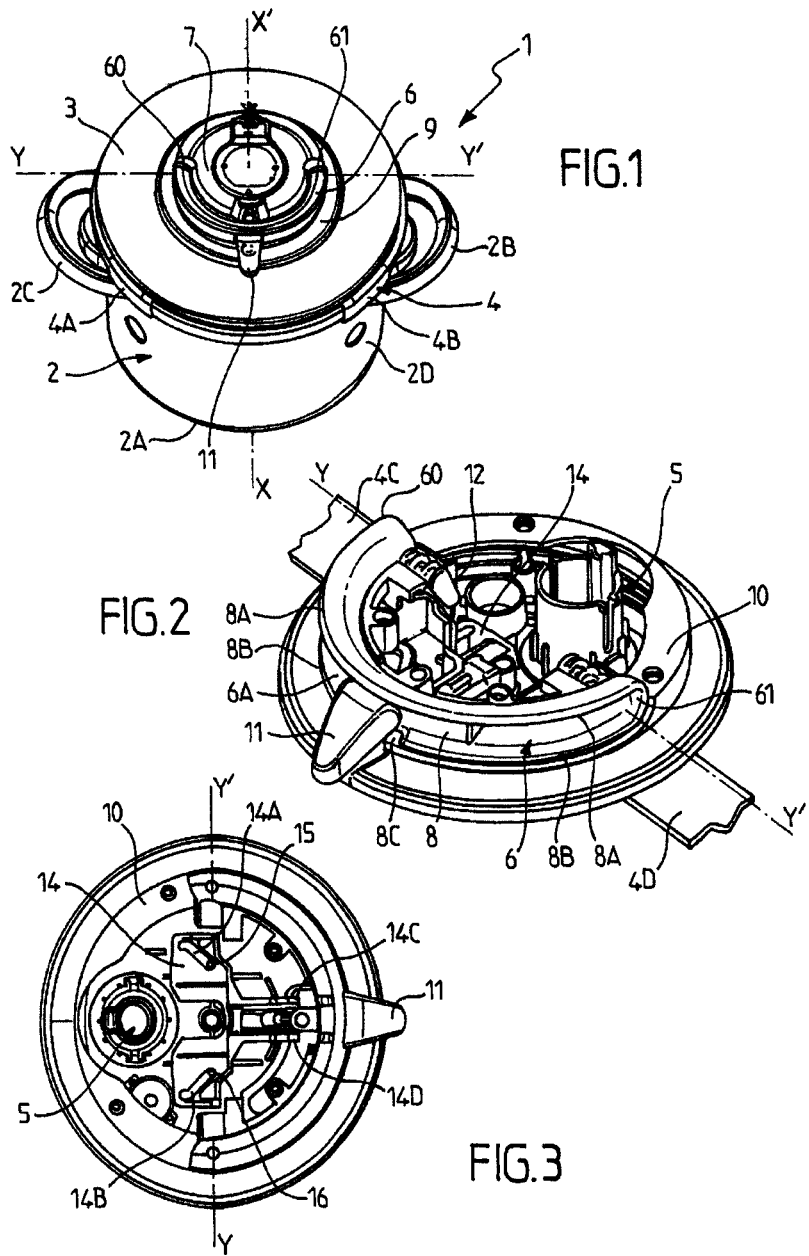

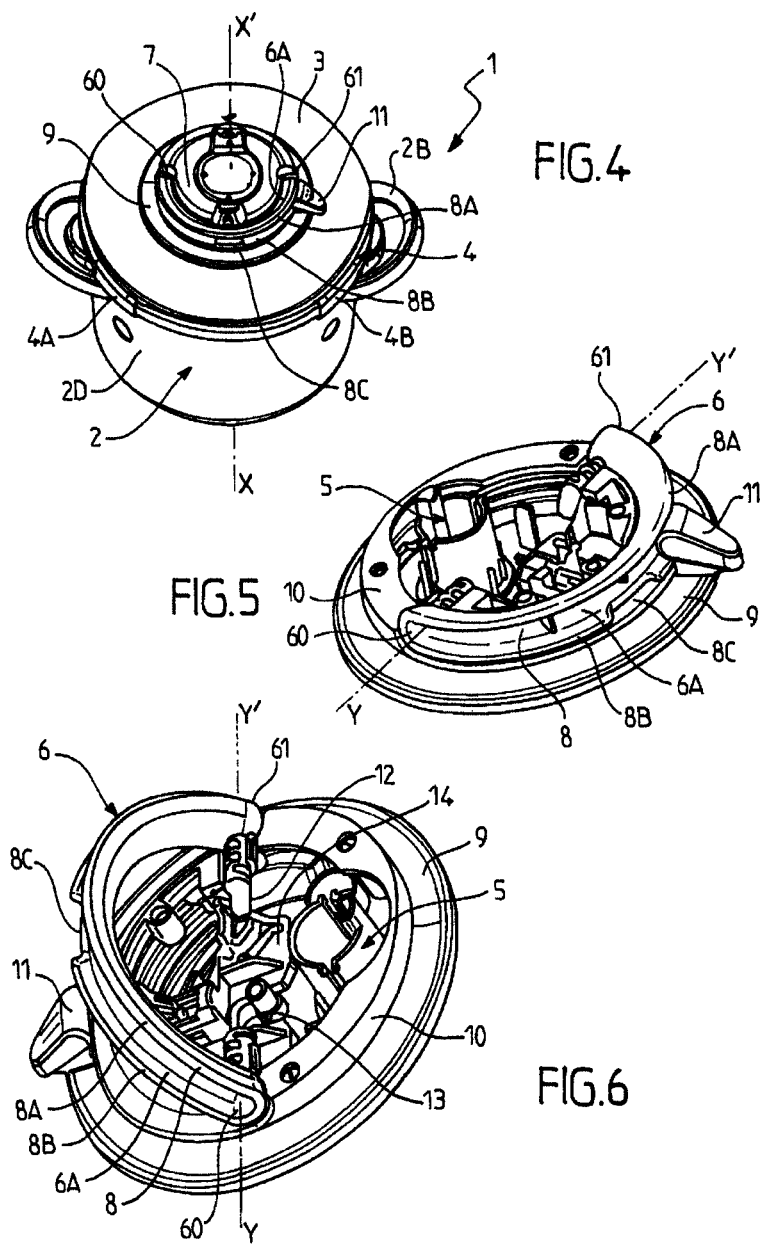

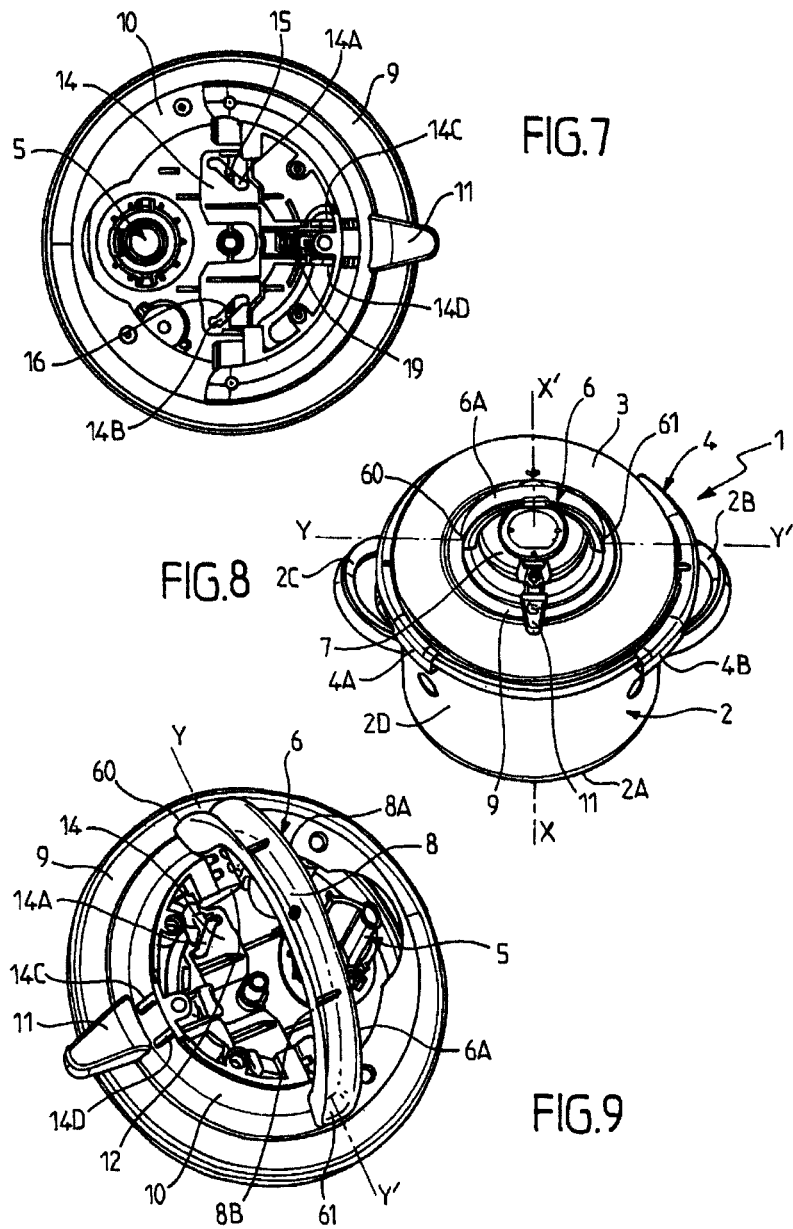

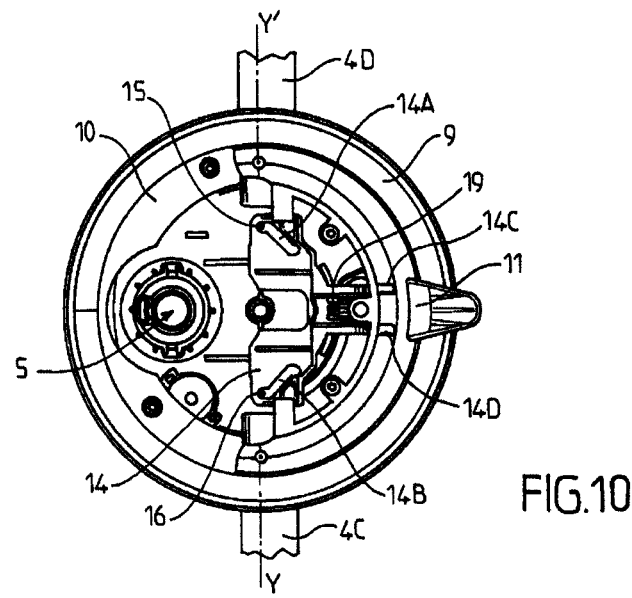
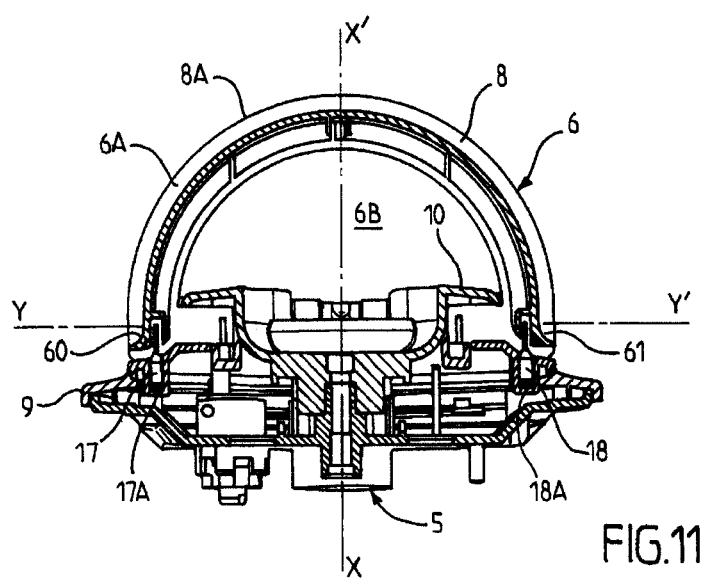

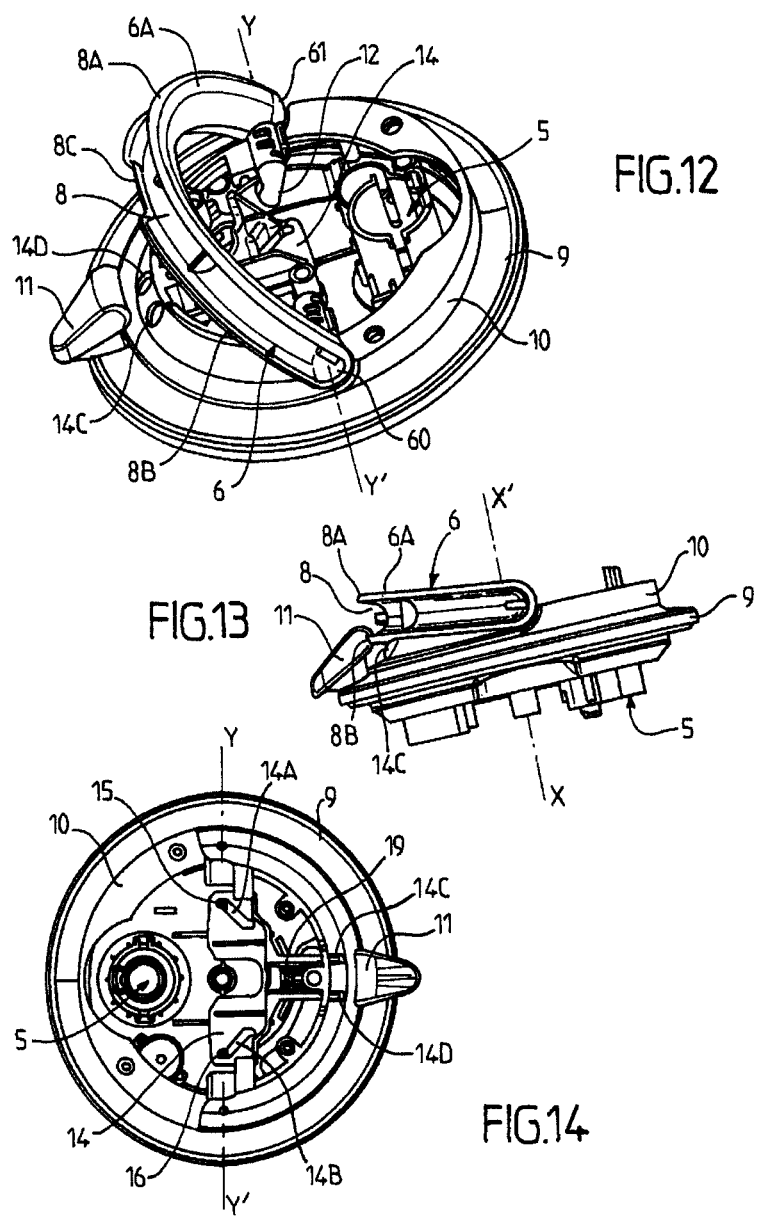

#

PRESSURE-COOKING UTENSIL HAVING A DUAL-PURPOSE LOCKING/UNLOCKING CONTROL MEMBER

This application is a §371 national stage of PCT International Application No. PCT/FR2009/052572, filed Dec. 16, 2009, claiming priority of French Patent Application No. 0859144, the entire contents of which are hereby incorporated by reference into this application.

TECHNICAL FIELD

The present invention relates to the general technical field of pressure-cooking utensils, and in particular of household utensils of the pressure cooker type, such a utensil comprising a vessel and a lid designed to be locked onto the vessel to form a substantially sealed cooking enclosure, and being designed to enable food contained in the vessel to be cooked under pressure.

The present invention relates more particularly to a utensil for cooking food under pressure, which utensil comprises firstly a vessel and a lid and secondly a control member for controlling locking/unlocking of the lid relative to the vessel.

STATE OF THE PRIOR ART

Pressure-cooking utensils are already known that comprise a vessel and a lid designed to be locked onto the vessel via locking/unlocking means suitable for going between a lid locking position and a lid unlocking position. For example, such locking/unlocking means implement a plurality of locking jaws secured to drive arms that are disposed radially over the lid, and that are caused to move by a control member mounted on the lid. The user can thus actuate the control member to cause the jaws to move radially, either outwards or inwards, so as to position the jaws respectively in the unlocking position or in the locking position. In particular, a pressure-cooking utensil is known whose locking/unlocking control member is constituted by a central knob mounted to move in rotation on the lid about an axis of rotation that is perpendicular to the mean plane of extension of the lid. The user can thus cause the jaws to move radially inwards and outwards by turning the central knob manually clockwise and anticlockwise.

In addition to this function of controlling locking/unlocking of the lid, the central knob is shaped also to act as graspable means via which the user can take hold of the lid and carry it.

That prior art pressure cooker is generally satisfactory. Nevertheless it can be further improved.

At the surface of the lid, that central knob forms a projection that is relatively voluminous, insofar as it must offer the user a sufficient handhold for enabling said user to take hold of the lid and to handle it. That lack of compactness can be problematic for storing and stowing the lid of the pressure cooker, and for washing it in a dish washer. In addition, the user can constantly be tempted to lift the lid by using the central knob, even when the lid is locked onto the vessel. That can therefore lead to an inadvisable situation in which the user uses the central knob to lift the entire utensil made up of the vessel and of the lid locked onto said vessel. Such handling is dangerous because, in view of the weight of the vessel, in particular when said vessel is filled with water and with food, the utensil can very easily slip from the user's grasp even though the handhold procured by the central knob is of good quality. Furthermore, using the central knob to lift and to handle the entire utensil (including the vessel) rather than for lifting the lid alone can give rise to considerable mechanical stress being put on the locking mechanism, and it is naturally preferable to avoid such stress.

OBJECT OF THE INVENTION

Objects assigned to the invention are consequently to remedy the various above-listed drawbacks and to propose a novel utensil for cooking food under pressure that, while being of particularly simple, compact, and inexpensive construction, is easy to stow and to wash in a dish-washer, while also being particularly safe to use.

Another object of the invention is to propose a novel utensil for cooking food under pressure that considerably limits, or indeed removes, the risk of seeing a user lift the entire utensil by the lid.

Another object of the invention is to propose a novel utensil for cooking food under pressure that is particularly practical to use.

Another object of the invention is to propose a novel utensil for cooking food under pressure that is particularly simple and reliable.

Another object of the invention is to propose a novel utensil for cooking food under pressure that is particularly ergonomic and that limits the risks of seeing the lid slip from the grasp of the user.

Another object of the invention is to propose a novel utensil for cooking food under pressure that operates in a manner that is particularly safe for the user.

These objects assigned to the invention are achieved by means of a utensil for cooking food under pressure, which utensil comprises firstly a vessel and a lid and secondly a control member for controlling locking/unlocking of the lid relative to the vessel, said utensil being characterized in that said control member is mounted to move on the lid between firstly a deployed position corresponding to the lid being unlocked, said deployed position being an abutment position in which said control member is designed to be taken hold of manually in order to enable the lid to be handled, and secondly a retracted position corresponding to the lid being locked and in which said control member is designed to be more difficult to take hold of manually than it is in the deployed position.

BRIEF DESCRIPTION OF THE DRAWINGS

Other features and advantages of the invention appear and emerge in more detail on reading the following description given with reference to the accompanying drawings that are given by way of non-limiting and illustrative example, and in which:

FIG. 1 is an overall perspective view of a cooking utensil of the invention for cooking food under pressure with its control member in the retracted position, said cooking utensil also being provided with an operating member for controlling operation of said utensil, which operating member is in a first position in which it substantially prevents the utensil from being brought up to pressure;

FIG. 2 is a perspective view of an implementation detail of the control member for controlling locking/unlocking of the utensil shown in FIG. 1;

FIG. 3 is a view from above of the implementation detail of FIG. 2;

FIG. 4 is an overall perspective view of the utensil of FIG. 1 with its control member still in the retracted position but with its operating member in a second position in which it allows the utensil to be brought up to pressure;

FIG. 5 is a perspective view of an implementation detail of the control member for controlling locking/unlocking of the utensil shown in FIG. 4;

FIG. 6 is a perspective view of the implementation detail of FIG. 2 once the locking/unlocking control member 1 has left its retracted position and is moving towards its deployed position;

FIG. 7 is a view from above of the implementation detail of FIG. 6, the control member being omitted for reasons of clarity;

FIG. 8 is an overall perspective view of the utensil of FIGS. 1 to 7 with the locking/unlocking control member in the deployed position;

FIG. 9 is a perspective view of an implementation detail of the control member for controlling locking/unlocking of the utensil shown in FIG. 8;

FIG. 10 is a view from above of the implementation detail of FIG. 9, the control member being omitted for reasons of clarity;

FIG. 11 is a section view of the implementation detail of FIG. 9;

FIG. 12 is a perspective view of the implementation detail of FIGS. 9 to 11 once the locking/unlocking control member has left its deployed position and is moving towards the retracted position;

FIG. 13 is a side view of the implementation of FIG. 12, the locking/unlocking control member being about to reach its retracted position; and FIG. 14 is a view from above of the implementation detail of FIG. 13, the control member being omitted for reasons of clarity.

BEST MANNER OF IMPLEMENTING THE INVENTION

The utensil 1 of the invention for cooking food under pressure is designed to cook various foods at a pressure level that is greater than atmospheric pressure, and preferably in a domestic context, it being understood that the invention may also relate to professional or semi-professional utensils. The utensil of the invention is thus advantageously a cooking utensil that is of a portable nature (i.e. it can be moved manually) and of an independent nature. In conventional manner, the utensil 1 of the invention is designed to be brought up to pressure exclusively under the effect of a heat source (regardless of whether that source is incorporated or external), without any external pressure being contributed.

Particularly preferably, the cooking utensil 1 of the invention is a pressure cooker.

In conventional manner, the pressure-cooking utensil 1 of the invention includes a vessel 2 forming a cooking receptacle and advantageously being circularly symmetrical about an axis X-X'.

Below, the adjective "axial" refers to the direction in which said axis of symmetry X-X' extends, which direction is the vertical direction when the utensil 1 is in normal use, i.e. is standing on a horizontal plane. In conventional manner, the vessel 2 is made of a metal material such as stainless steel, and is, for example, provided with a heat-conductive bottom 2A that is secured to the vessel by any suitable technique (e.g. by hot stamping). The vessel 2 may also being provided graspable members, such as handles 2B, 2C, of which there are preferably two, and that are fastened to the side wall 2D of the vessel, e.g. in diametrically opposite manner.

The utensil 1 of the invention also includes a lid 3 that is designed to be mounted and locked onto the vessel 2 so as to co-operate therewith to form a cooking enclosure that is substantially sealed, i.e. that is sufficiently airtight to enable the utensil 1 to be brought up to pressure. The lid 3 is advantageously disk-shaped in overall shape, and, when said lid is mounted and locked onto said vessel, it advantageously extends in a mean plane that is substantially parallel to the mean plane in which the bottom 2A of the vessel 2 extends.

The lid 3 can thus be locked or unlocked on the vessel 2 by locking/unlocking means 4 for locking/unlocking the lid 3 relative to the vessel 2. Locking the lid 3 on the vessel 2 enables the cooking enclosure to be brought up to pressure without any risk of the lid coming off under the effect of the pressure. The locking/unlocking means 4 may be of any type known to the person skilled in the art, and, in conventional manner, they are suitable for going between a locking position for locking the lid 3 relative to the vessel 2, in which locking position the lid 3 is secured to the vessel 2, and an unlocking position for unlocking the lid 3 relative to the vessel 2, in which unlocking position the lid 3 can be freely separated from the vessel 2.

By way of example of such locking/unlocking means 4 that are usable in the context of the invention, mention can be made of locking/unlocking means having jaws or segments, it being understood that the invention is in no way limited to a particular type of locking/unlocking means 4. In the preferred variant shown in the figures, the locking/unlocking means 4 for locking/unlocking the lid 3 relative to the vessel 2 comprise two jaws 4A, 4B mounted to move in radial translation over and relative to the lid 3 via corresponding drive arms 4C, 4D extending in diametrically opposite manner relative to the general axis of symmetry X-X' of the utensil 1. The jaws 4A, 4B are thus mounted, via the drive arms 4C, 4D, to move between firstly a locking position in which each jaw 4A, 4B clamps the lid 3 and the rolled top rim of the vessel 2 and secondly an unlocking position obtained by moving the jaws 4A, 4B outwards from their locking position and in which the jaws 4A, 4B are no longer in engagement with the rolled rim of the vessel 2, thereby enabling the lid 3 to be released from the vessel 2 freely by the user. Preferably, the locking position is a return position, such a return effect being obtained, for example, by interposing a spring that interconnects the drive arms 4C, 4D and that urges them back towards each other. Each drive arm 4C, 4D extends more precisely between an inner end designed to co-operate with a locking/unlocking control member 6, and an outer end that carries the corresponding jaw 4A, 4B. Each jaw 4A, 4B is advantageously in the form of a U-shaped metal plate as is well known to the person skilled in the art.

However, it is quite possible for the outer end of each segment 4C, 4D not to carry any jaw and to be designed simply to penetrate into a corresponding slot provided in the vessel, in the manner of a bolt-and-keeper system.

Such a locking system of the bolt-and-keeper type (not shown) that can be referred to as a "segment locking system" is well known per se, so that it is not necessary to describe it in any further detail.

The utensil 1 of the invention for cooking food under pressure advantageously includes pressure regulator means 5 mounted in leaktight communication with a corresponding hole (not shown) provided in the lid 3 and arranged so as to maintain the relative pressure (i.e. the pressure measured above atmospheric pressure) prevailing in the enclosure at a substantially constant predetermined value or "operating" pressure. The general operating principle of such regulator means 5 is well known to the person skilled in the art so that it is not necessary to describe it in any further detail herein. Advantageously, the regulator means 5 are provided with a setting system enabling the user to select a predetermined operating pressure from a choice of a plurality of operating pressure levels, via a pressure selection member, as a function, for example, of the type of food present in the utensil 1. Advantageously, the pressure regulator means 5 are designed so that the operating pressure lies in a range extending substantially from 10 kilopascals (kPa) to 90 kPa.

As mentioned above, the food-cooking utensil 1 of the invention also has a control member 6 for controlling locking/unlocking of the lid 3 relative to the vessel 2. The control member 6 is designed to be operated by the user in a manner enabling the user to control the locking/unlocking means 4, and preferably to control the radial movement of the drive arms 4C, 4D and of the corresponding jaws 4A, 4B. The control member 6 for controlling locking/unlocking 1 of the lid 3 relative to the vessel 2 is mounted to move on the lid 3 between firstly a deployed position (visible in FIGS. 8, 9, and 11) corresponding to the lid 3 being unlocked, and in which said control member 6 is designed to be taken hold of manually in order to enable the lid 3 to be handled by the user, and secondly a retracted position (visible in to FIGS. 1, 2, 4, and 5) corresponding to the lid 3 being locked and in which said control member 6 is designed to be more difficult to take hold of manually than it is in the deployed position. Thus, the control member 6 is designed to be suitable for being moved manually by a user from its deployed position to its retracted position, and vice versa. The control member 6 interacts with the locking/unlocking means 4 so that when the control member 6 is in its deployed position, the locking/unlocking means 4 are in the unlocking position, i.e. the lid 3 can be freely mounted on and removed from the vessel 2, whereas when the control member 6 is in its retracted position, the locking/unlocking means 4 then take up their locking position, preventing the lid 3 from being released from the vessel 2. The locking/unlocking means 4 going from their locking position to their unlocking position is thus obtained by the control member 6 being moved manually from its retracted position to its deployed position. Conversely, the locking/unlocking means 4 going from their deployed position to their retracted position is obtained by the control member 6 being moved manually from its deployed position to its retracted position. The deployed position of the control member 6 is an abutment position. This makes it possible to limit the possibilities of movement of the control member 6 relative to the lid 3, and thus to make the lid 3 safer to handle.

In order to improve further the safety and comfort of use, the deployed position is preferably a stable position, thereby preventing the control member 6 from returning to the retracted position at the wrong time, with all the negative consequences that such an untimely return might cause.

Correspondingly, the retracted position is advantageously an abutment position, thereby making the locking safer. For the same reason and in preferred manner, the retracted position is a stable position.

As mentioned above, when the control member 6 is in the deployed position, it is designed to be taken hold of manually so as to enable the lid 3 to be handled by the user. This means that, in the deployed position, the control member 6 takes up a handle shape making it possible for the user to handle, i.e. to take hold of firmly and to lift, the lid 3, in order to move it from one place to another, and, for example, in order to place it on the vessel 2 or, conversely, to remove it from the vessel 2. In other words, in its deployed position, the control member 6 has a shape and size sufficient to enable said control member 6 to be taken hold of directly, firmly and with assurance by the user, the handhold procured in this way enabling the user to support the weight of the lid 3 firmly. To this end, various shaping configurations are possible for the control member 6, such as, for example, a carrying handle shape (variant shown in the figures) or a T-shape, an L-shape, a bulbous knob shape, a flared knob shape, etc. Thus, the utensil 1 is provided with a graspable member via which to take hold of the lid 3, which member is attached to the lid and is designed to be taken hold of manually in order to enable the lid 3 to be handled via said member, said graspable member being formed solely by said control member 6 in the deployed position. In other words, the control member 6 constitutes the only means specifically designed to be taken hold of manually (in the deployed position) in order to handle the lid 3 via said member.

Conversely, when the control member 6 is in the retracted position, it is more difficult for the user to take hold of it manually than when it is in the deployed position, i.e. the geometrical configuration of the control member 6 and, for example, its angular position relative to the lid 3 to which it is attached make it more difficult for the same user to catch hold of the control member 6 firmly, this difficulty advantageously being sufficient to dissuade the user from using the control member 6 in the retracted position as a handle for handling, i.e. for lifting and moving the lid 3.

Thus, the control member 6 for controlling locking/unlocking of the lid 3 relative to the vessel 2 performs the following three functions:
  a control function for controlling locking/unlocking, making it possible, for example, for the user to cause the jaws 4A, 4B to move from the locking position to the unlocking position;
  a handle function, enabling the user to take hold of the lid 3 via the control member 6 when said control member is in its deployed position; and
  a safety function, making it possible to limit the possibility of the user taking hold of the lid 3 via the control member 6 when said control member is in the retracted position which corresponds to the lid 3 being locked on the vessel 2.

The control member 6 thus has varying suitability for being taken hold of, this suitability varying as a function of the position of the control member 6, which position is itself dependent on whether the locking/unlocking means 4 for locking/unlocking the lid 3 relative to the vessel 2 are in the locking state or in the unlocking sate. Therefore, the invention makes it possible to limit the risk of seeing a user consider or indeed be capable of handling the lid 3 when said lid is locked on the vessel 2.

Advantageously, in the retracted position, the control member 6 is designed to be substantially impossible for the user to take hold of manually, in order to handle the lid 3. In other words, in the preferred situation that corresponds to the variant shown, the control member 6 is substantially completely stowed away in the retracted position, so that the user has no available surface offering a sufficient handhold for said user to take hold of the lid 3 via the control member 6. However, as in the variant shown in the figures, this does not prevent the control member 6 from being suitable for being handled by the user to go from its retracted position to its deployed position, i.e. the control member 6 offers a handhold that is sufficient for the control member 6 to be moved manually from its retracted position to its deployed position but that is insufficient to enable the lid 3 to be handled.

Advantageously, in its deployed position, the control member 6 extends from the lid 3 in a mean direction that is mainly perpendicular to the mean plane of extension of the lid 3, and even more preferably, in a direction that is substantially parallel to the vertical direction, embodied by the axis X-X'. In the preferred variant shown in the figures, the mean plane of extension of the lid 3 is substantially parallel to the plane of the sheet on which FIGS. 3, 7, 10, and 14 are drawn. The term "mean direction that is mainly perpendicular" means a direction having a vertical component (i.e. parallel to the axis X-X') that is greater than its horizontal component (perpendicular to the axis X-X'). Preferably, as explained above, the control member 6 extends vertically to the lid 3 but, it is absolutely not excluded for it to extend slantwise, the essential requirement being that it is sufficiently graspable by the user. Advantageously, in its retracted position, the control member 6 extends from the lid 3 in a mean direction that is mainly parallel to the mean plane of extension of the lid 3, and preferably in a direction that is substantially horizontal, i.e. perpendicular to the axis X-X' and lying in a plane parallel to the mean plane of extension of the lid 3. In other words, the control member 6 is advantageously designed to project vertically from the surface of the lid 3 in the deployed position, and to be folded away against and along the lid 3, preferably parallel thereto, in the retracted position.

Advantageously, the control member 6 is mounted to pivot on the lid 3 between its deployed and its retracted positions, about a pivot axis Y-Y' that itself extends in a mean direction that is mainly parallel to the mean plane of extension of the lid 3. Said pivot axis Y-Y' is thus advantageously perpendicular to the axis X-X'. Advantageously, in order to enable the lid 3 to be handled in balanced manner and in order to simplify the overall design of the utensil 1, the control member 6 is centered on the lid 3, so that the pivot axis Y-Y' then advantageously intersects the axis X-X' corresponding to the vertical direction. Advantageously, the control member 6 is designed to move through an angular stroke substantially equal to 90° between a folded-away position, corresponding to the retracted position, in which the angle formed between the mean plane of extension of the lid 3 and the mean plane of extension of the control member 6 is substantially zero, and an unfolded position, corresponding to the deployed position, in which the angle between the mean plane of extension of the lid 3 and the mean plane of extension of the control member 6 is substantially 90°.

Such a design makes it possible to differentiate the deployed configuration from the retracted configuration, particularly clearly, thereby enabling the user to deduce at a glance that the lid 3 is locked. In addition, since the angle between the mean planes of extension of the lid 3 and of the control member 6 is substantially zero in the retracted position, it is, in any event, impossible, in practice, for the user to use the control member 6 as a member via which to take hold of the lid 3, thereby contributing to the safety of use of the utensil 1.

Per se and independently to the other aspects described herein, the invention also relates to a utensil 1 for cooking food under pressure that comprises firstly a vessel 2 and a lid 3 and secondly a control member 6 for controlling locking/unlocking of the lid 3 relative to the vessel 2, said control member 6 being formed by a handle designed to be taken hold of manually in order to enable the lid 3 to be handled, said handle being mounted to move, preferably by pivoting about an axis that is substantially perpendicular to the vertical axis X-X' between a folded-away position in which it is folded away against the lid 3, corresponding to the lid 3 being locked on the vessel 2, and an unfolded position, corresponding to the lid 3 being unlocked.

Advantageously, the control member 6 comprises a carrying handle 6A, i.e. a loop-shaped arcuate piece, advantageously designed to be taken hold of firmly and held by the user. The carrying handle 6A is advantageously designed to project from the lid 3 in the deployed position, and to be folded away against the lid 3 in the retracted position, as shown in the figures. The use of a control member 6 in the form of a carrying handle 6A is particularly preferred because it enables the user to take hold of it particularly firmly and with particular assurance, while also being easy to retract. In particular, it is advantageous for the lid 3 to have a piece in relief 7 at its surface, the shape of which piece in relief is substantially complementary to the shape of the empty space 6B defined by the carrying handle 6A and designed to receive the fingers of the user.

Thus, when the carrying handle 6A is folded away completely against the lid 3, parallel thereto, the empty space 6B is at least partially filled by the piece in relief 7, so that the carrying handle 6A then advantageously extends following on from the piece in relief 7, thereby limiting the possibility of the user catching hold of the carrying handle 6A nonetheless for handling the lid 3. In other words, the lid 3 has a piece in relief 7 at its surface that is designed to fill said empty space 6B at least partially when the carrying handle 6A is folded away against the lid 3 in the retracted position, thereby limiting the possibility of the user catching hold of the carrying handle 6A for handling the lid 3.

The use of a carrying handle 6A constitutes an invention in itself, independently of the aspects described herein. This inventive aspect relates more precisely to a utensil 1 for cooking food under pressure that comprises firstly a vessel 2 and a lid 3 and secondly a control member 6 for controlling locking/unlocking of the lid 3 relative to the vessel 2, said control member 6 being formed by a carrying handle 6A.

Preferably, the control member 6 substantially has a circularly arcuate outline, as shown in the figures. In which case, said carrying handle 6A advantageously extends around a substantially semicircular outline between a first end 60 and a second end 61 through which ends said pivot axis Y-Y' substantially passes, said first and second ends 60, 61 thus being disposed to be substantially diametrically opposite about the axis X-X'. In other words, the carrying handle 6A substantially has the shape of an arch corresponding advantageously to a semicircle whose diameter is chosen to enable the user to slip at least two fingers (e.g. the index finger and the middle finger), and preferably at least three fingers (index, middle, and ring fingers), into the orifice 6B defined by said arch and by the lid 3, a space sufficient for enabling four fingers (index, middle, ring, and little fingers) to be inserted being preferred.

A circularly arcuate, and in particular semicircular, outline is particularly comfortable for the user and also allows the operation of the utensil 1 described below to be made specially safe as described below. In this specially safe embodiment that is shown in the figures, the control member 6, constituted in this example by the semicircular carrying handle 6A, is provided with a groove 8 that follows the outline of the carrying handle 6A, and that thus extends substantially circularly arcuately, and preferably over a semicircle as shown.

The utensil 1 also has an operating member 9 for controlling operation of said utensil, which operating member is mounted to move in rotation on the lid 3 about an axis of rotation passing through the center of said circular arc around which the groove 8 extends and substantially perpendicular to the mean plane in which said groove 8 extends when the control member 6 is in the retracted position. In the variant shown in the figures, the axis of rotation of the operating member 9 corresponds to the axis X-X". Advantageously, the operating member 9 for controlling operation of the utensil 1 is mounted to move in rotation on the lid 3 between a first position (shown in FIGS. 4 and 5), in which said operating member 9 allows the utensil 1 to be brought up to pressure, and a second position (shown in FIGS. 1 and 2) in which said operating member 9 substantially prevents said utensil from being brought up to pressure. For example, the first position corresponds to an active state of the regulator means 5, i.e. to a state in which the pressure regulation valve for regulating the pressure of the utensil 1 is active and can regulate the pressure inside the utensil 1. Conversely, when the operating member 9 is in its second position, then the regulator means 5 are deactivated, i.e. the corresponding regulation valve is lifted off of its seat, in order to enable the inside of the cooking enclosure to communicate continuously with the outside, thereby preventing the utensil 1 from being brought up to pressure (and in particular enabling the utensil 1 to be decompressed, as applicable). In this situation, the first position of the operating member 9 corresponds to a cooking position, whereas the second position corresponds to a decompression position. Advantageously, the operating member 9 makes it possible to select a plurality of different cooking positions, each of which corresponds to a different setting of the valve forming the regulator means 5. In this situation, the operating member 9 thus forms a pressure selector that also controls decompression of the utensil.

In the example shown in the figures, the operating member 9 is constituted by a ring-shaped part that, concentrically, about the axis X-X', surrounds a circular plate 10 attached to the lid 3 and on which the carrying handle 6A is mounted to pivot. In this situation, the piece in relief 7 is advantageously constituted by a cap mounted on the circular plate 10 in order to mask the control mechanism.

The operating member 9 is advantageously provided with a latch 11, which is preferably attached securely to the ring constituting the operating member 9. The latch 11 is thus advantageously embedded on the operating member 9 and is thus constrained to turn with it about the axis X-X', said axis X-X' also advantageously passing through the centre of the circular arc around which the groove 8 extends. Advantageously, the latch 11 is designed to co-operate with the groove 8 as follows:

The control member 6, constituted in this example by the carrying handle 6A, is shaped to allow the latch 11 to penetrate into the groove 8 only when the operating member 9 is in its second position (shown in FIGS. 1 and 2) and when the control member 6 goes from its deployed position to its retracted position. In other words, the control member 6 is shaped so that, when it is folded away, from its deployed position, to its retracted position, the latch 11 can penetrate into the groove 8 at the time the control member 6 reaches its retracted position. The utensil 1 is then in a configuration shown in FIGS. 1 and 2, in which the control member 6 is in its retracted position while the latch 11 is inserted, at least in part into the groove 8. In order to enable the latch 11 to be inserted into the groove 8, said groove is advantageously defined by a top flange 8A and by a bottom flange 8B that are substantially parallel and continuous, and perpendicular to the end wall of the groove, the bottom flange 8B being provided with a notch 8C enabling the latch 11 to pass through when said latch is in its second position and when the control member 6 is folded down against the lid 3 in the retracted position. Correspondingly, the control member 6 is advantageously shaped so that it can go from its retracted position to its deployed position only when the control member 9 finds itself in its second position.

Once in the groove 8, the latch 11 can slide along said groove which, it should be recalled, extends around a circular outline, thereby allowing the operating member 9 to go from its second position to its first position, the presence of the latch 11 in the groove 8 nevertheless preventing the control member 6, constituted in this example by the carrying handle 6A, from returning to its deployed position when the operating member 9 is in its first position, because the latch 11 is then no longer in register with the notch 8C and comes into blocking abutment against the bottom flange 8B defining the groove 8.

Thus, the circular shape of the control member 6 makes it possible to form a guide path for the latch 11, so that a function of locking the control member 6 in the retracted position that is particularly reliable and simple can be obtained, which indeed constitutes an invention per se.

Operation of the particular variant shown in the figures is described chronologically below.

Firstly, the utensil 1 is in the cooking configuration, i.e. its lid 3 is mounted and locked on the vessel 2 by the locking/unlocking means 4. In this configuration, shown in FIGS. 4 and 5, the control member 6, comprising the carrying handle 6A in this example, finds itself in the retracted position, and is held stationary in this position by the latch 11. In this configuration, the carrying handle 6A thus finds itself following on from the piece in relief 7 formed by the cap mounted on the plate 10, so that the lid 3 generally has a relatively smooth aspect, without any member resembling a handle or that could be used as a handle appearing to the eyes of the user. In addition, even if the user nonetheless wants to attempt to cause the carrying handle 6A to pivot so as to use it as a graspable member, said user is prevented from doing so by the latch 11 that holds the carrying handle 6A stationary in the retracted position. At the end of the cooking cycle, the user causes the operating member 9 to move in rotation about the axis X-X' to bring said operating member 9 into its second position (shown in FIGS. 1 and 2), thereby causing the regulation valve to be lifted off its seat and thus the utensil 1 to be depressurized by the inside of the cooking enclosure being put into communication with the outside.

In this configuration, shown in FIGS. 1 and 2, the latch 11 finds itself in register with the notch 8C provided in the bottom flange 8B. It is then possible for the user, subject to other opening safety means (not shown) so allowing as a function of the pressure prevailing inside the cooking enclosure, to bring the carrying handle 6A back into its deployed position, by pivoting it through an angular stroke of 90° about the pivot axis Y-Y'. This path from the retracted position to the deployed position is shown in FIG. 6. The carrying handle 6A being pivoted causes a pair of cams 12, 13 to move concomitantly in rotation, the pair of cams being mounted at respective ones of the first and second ends 60, 61 of the carrying handle 6A. Each cam 12, 13 thus comes to push on an intermediate control part 14 that is mounted to move in translation on the plate 10 along an axis substantially perpendicular both to the pivot axis Y-Y' and to the overall axis of symmetry X-X'. The intermediate control part 14 is thus pushed away by the cams 12, 13 under the effect of the control member 6 pivoting from its retracted position to its deployed position. In order to guarantee continuous contact between the cams 12, 13 and the intermediate control plate 14, said intermediate control plate is subjected to the action of a return spring 19 (shown only in the views from above of FIGS. 3, 7, 10, and 14) that continuously pushes the intermediate control plate 14 against said cams 12, 13.

The control part 14 is provided conventionally with slanting slots 14A, 14B that co-operate with lugs 15, 16 connected to respective ones of the drive arms 4C, 4D towards the inner ends thereof. Thus, the intermediate control plate 14 moving in translation acts, via the slots 14A, 14B, to cause the lugs 15, 16 to move radially, and thus to cause the drive arms 4C, 4D to which said lugs are respectively attached to move radially. Such a principle for controlling the radial movement of the drive arms 4C, 4D is well known per se, and is described, for example, in Document FR-2 863 849 A1 the contents of which is incorporated herein by way of reference. Thus, via its slots 14A, 14B, the intermediate control plate 14 pushes away the drive arms 4C, 4D radially outwards, thereby moving the jaws 4A, 4B away from the rolled rim of the vessel 2. The carrying handle 6A continues along its path until it reaches an abutment position (cf. FIGS. 10 and 11) in which said carrying handle 6A extends vertically above the lid 3.

This position corresponds to the jaws 4A, 4B being mutually spaced apart to the maximum extent, corresponding to the unlocking position. This deployed position of the control member 6 is advantageously a stable position, by means of the action of slidably mounted vertical studs 17, 18 that penetrate into suitable complementary shapes provided in the carrying handle 6A, towards the corresponding end 60, 61 thereof. To this end, each stud 17, 18 is mounted to move in vertical translation on the plate 10, and is subjected to the action of a corresponding return spring 17A, 18A that pushes the respective stud 17, 18 against the carrying handle 6A.

The user can then take hold of the arch 6A with one hand, firmly and with assurance, and thus lift the lid 3 in order to dissociate it from the vessel 2. It is thus particularly practical to take hold of the lid 3 by means of a handle that is particularly ergonomic and that is constituted by the carrying handle 6A that projects from the lid 3. Naturally, it is quite possible, for the purpose of stowing the lid 3 or of putting it in a dish washer, for the user then to fold the carrying handle 6A away. To do so, the user brings the carrying handle 6A back from its deployed position to its retracted position. This path is shown by FIGS. 12 and 13. Throughout almost all of this path for folding the carrying handle 6A away against the lid 3, the cams 12, 13 are preferably no longer in contact with the intermediate control plate 14 which remains blocked in its position shown in FIG. 10, corresponding to the lid 3 being unlocked. This blocking effect is obtained by means of the slots 14A, 14B being suitably shaped as is well known per se and therefore needing no further description herein. As it approaches its retracted position, as shown in FIG. 13, said carrying handle 6A comes to bear on a trigger constituted, in this example, by two rounded ribs 14C, 14D that are integral with the intermediate control plate 14. By bearing on said ribs 14C, 14D, the carrying handle 6A pushes the intermediate control plate 14 out of its stable position so that, under the action of the spring 19 and under the action of the return spring urging the drive arms back towards each other, the intermediate control plate 14 is suddenly propelled to its position corresponding to the jaws being locked.

SUSCEPTIBILITY OF INDUSTRIAL APPLICATION

The invention finds industrial application in the design, fabrication and use of cooking utensils, especially of utensils for cooking under pressure of the pressure cookers type.

What is claimed is:

1. A utensil (1) for cooking food under pressure, said utensil comprising firstly a vessel (2) and a lid (3) and secondly a control member (6) for controlling locking/unlocking of the lid (3) relative to the vessel (2), said utensil being characterized in that said control member (6) is mounted to move on the lid (3) between firstly a deployed position corresponding to the lid (3) being unlocked, said deployed position being an abutment position in which said control member (6) is designed to be taken hold of manually in order to enable the lid (3) to be handled, and secondly a retracted position corresponding to the lid (3) being locked and in which said control member (6) is designed to be more difficult to take hold of manually than it is in the deployed position, wherein the control member is connected to the lid at two pivot points near respective longitudinal ends of the control member.

2. A utensil (1) according to claim 1, characterized in that said deployed position is a stable position.

3. A utensil (1) according to claim 1, characterized in that said retracted position is an abutment position.

4. A utensil (1) according to claim 1, characterized in that said retracted position is a stable position.

5. A utensil (1) according to claim 1, characterized in that it is provided with a graspable member via which to take hold of the lid (3), which member is attached to the lid (3) and is designed to be taken hold of manually in order to enable the lid (3) to be handled via said member, said graspable member being formed solely by said control member (6) in the deployed position.

6. A utensil (1) according to claim 1, characterized in that, in the retracted position, the control member (6) is designed to be substantially impossible for the user to take hold of manually, in order to handle the lid (3).

7. A utensil (1) according to claim 1, characterized in that, in its deployed position, said control member (6) extends from the lid (3) in a mean direction that is mainly perpendicular to the mean plane of extension of the lid (3), while in its retracted position, it extends from the lid (3) in a mean direction that is mainly parallel to the mean plane of extension of the lid (3).

8. A utensil (1) according to claim 1, characterized in that said control member (6) comprises a carrying handle (6A) that projects from the lid (3) in the deployed position, and is folded away against the lid (3) in the retracted position.

9. A utensil (1) according to claim 8, characterized in that said carrying handle (6A) defines an empty space (6B) designed to receive the fingers of the user, the lid (3) having a piece in relief (7) at its surface that is designed to fill said empty space (6B) at least partially when the carrying handle (6A) is folded away against the lid (3) in the retracted position, thereby limiting the possibility of the user catching hold of the carrying handle (6A) for handling the lid (3).

10. A utensil (1) according to claim 1, characterized in that said control member (6) substantially has a circularly arcuate outline.

11. A utensil (1) according to claim 1, characterized in that said control member (6) is mounted to pivot on the lid (3) between its deployed and its retracted positions, about a pivot axis (Y-Y') that itself extends along a mean direction that is mainly parallel to the mean plane of extension of the lid (3), said carrying handle (6A) extending around a substantially semicircular outline between a first end (60) and a second end (61) through which ends said pivot axis (Y-Y') substantially passes.

12. A utensil (1) according to claim 2, characterized in that said retracted position is an abutment position.

13. A utensil (1) according to claim 2, characterized in that said retracted position is a stable position.

14. A utensil (1) according to claim 3, characterized in that said retracted position is a stable position.

15. A utensil (1) according to claim 2, characterized in that it is provided with a graspable member is which to take hold of the lid (3), which member is attached to the lid (3) and is designed to be taken hold of manually in order to enable the lid (3) to be handled via said member, said graspable member being formed solely by said control member (6) in the deployed position.

16. A utensil (1) according to claim 3, characterized in that it is provided with a graspable member via which to take hold of the lid (3), which member is attached to the lid (3) and is designed to be taken hold of manually in order to enable the lid (3) to be handled via said member, said graspable member being formed solely by said control member (6) in the deployed position.

17. A utensil (1) according to claim 2, characterized in that, in the retracted position, the control member (6) is designed to be substantially impossible for the user to take hold of manually, in order to handle the lid (3).

18. A utensil (1) according to claim 2, characterized in that, in its deployed position, said control member (6) extends from the lid (3) in a mean direction that is mainly perpendicular to the mean plane of extension of the lid (3), while in its retracted position, it extends from the lid (3) in a mean direction that is mainly parallel to the mean plane of extension of the lid (3).

19. A utensil (1) according to claim 2, characterized in that said control member (6) comprises a carrying handle (6A) that projects from the lid (3) in the deployed position, and is folded away against the lid (3) in the retracted position.

20. A utensil (1) for cooking food under pressure, said utensil comprising firstly a vessel (2) and a lid (3) and secondly a control member (6) for controlling locking/unlocking of the lid (3) relative to the vessel (2), said utensil being characterized in that said control member (6) is mounted to move on the lid (3) between firstly a deployed position corresponding to the lid (3) being unlocked, said deployed position being an abutment position in which said control member (6) is designed to be taken hold of manually in order to enable the lid (3) to be handled, and secondly a retracted position corresponding to the lid (3) being locked and in which said control member (6) is designed to be more difficult to take hold of manually than it is in the deployed position, wherein the control member is connected to the lid at two pivot points near respective longitudinal ends of the control member, wherein said control member (6) is provided with a groove (8) extending substantially circularly arcuately, said utensil (1) also having an operating member (9) for controlling operation of said utensil, which operating member is mounted to move in rotation on the lid (3) about an axis of rotation passing through the center of said circular arc and substantially perpendicular to the mean plane in which said groove (8) extends when the control member (6) is in the retracted position, between a first position in which said operating member (9) allows the utensil (1) to be brought up to pressure, and a second position in which it substantially prevents said utensil from being brought up to pressure, said operating member (9) being provided with a latch (11) designed to co-operate with the groove (B) as follows:

said control member (6) is shaped to allow the latch (11) to penetrate into the groove (8) only when the operating member (9) is in its second position and when the control member (6) goes from its deployed position to its retracted position; and once in the groove (8), the latch (11) can slide along said groove, thereby allowing the operating member (9) to go from its second position to its first position, the presence of latch (11) in the groove (8) nevertheless preventing the control member (6) from returning to its deployed position when the operating member (9) is in its first position.

* * * * *